(12) United States Patent
Sato

(10) Patent No.: US 6,532,340 B1
(45) Date of Patent: Mar. 11, 2003

(54) SHAKE REDUCTION CAMERA

(75) Inventor: Tatsuya Sato, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/549,924

(22) Filed: Apr. 14, 2000

(30) Foreign Application Priority Data

Apr. 22, 1999 (JP) .......................................... 11-115019

(51) Int. Cl.[7] .............................................. G03B 17/40
(52) U.S. Cl. ........................................ 396/52; 396/263
(58) Field of Search ........................... 396/52, 55, 147, 396/148, 373, 382, 281, 263

(56) References Cited

U.S. PATENT DOCUMENTS

| 5,614,980 A | * | 3/1997 | Wakabayashi et al. | 396/147 |
| 5,655,163 A | * | 8/1997 | Tsukahara et al. | 396/287 |
| 5,937,214 A | * | 8/1999 | Shintani et al. | 396/55 |

FOREIGN PATENT DOCUMENTS

| JP | 5-204019 | 8/1993 |
| JP | 9-230472 | 9/1997 |
| JP | 10-48681 | 2/1998 |

* cited by examiner

*Primary Examiner*—Russell Adams
*Assistant Examiner*—Arthur A Smith
(74) *Attorney, Agent, or Firm*—Frishauf, Holtz, Goodman & Chick, P.C.

(57) ABSTRACT

A camera is provided which commences exposure at a timing at which a shake amount is reduced. An exposure operation commencement instruction section gives an instruction to commence an exposure operation. A focusing lens drive device drives a focusing lens responsive to the instruction. An exposure operation commencement decision section determines a required delay time based on the shake state of the camera body after the instruction to commence the exposure operation has been given. An exposure device commences the exposure operation according to the determined delay time. And an operating state of one of the focusing lens drive device, the exposure operation commencement decision section and the exposure device which is being operated is displayed in a discernible form. The focusing lens drive device, the exposure operation commencement decision section and the exposure section are successively operated in response to the instruction.

15 Claims, 7 Drawing Sheets

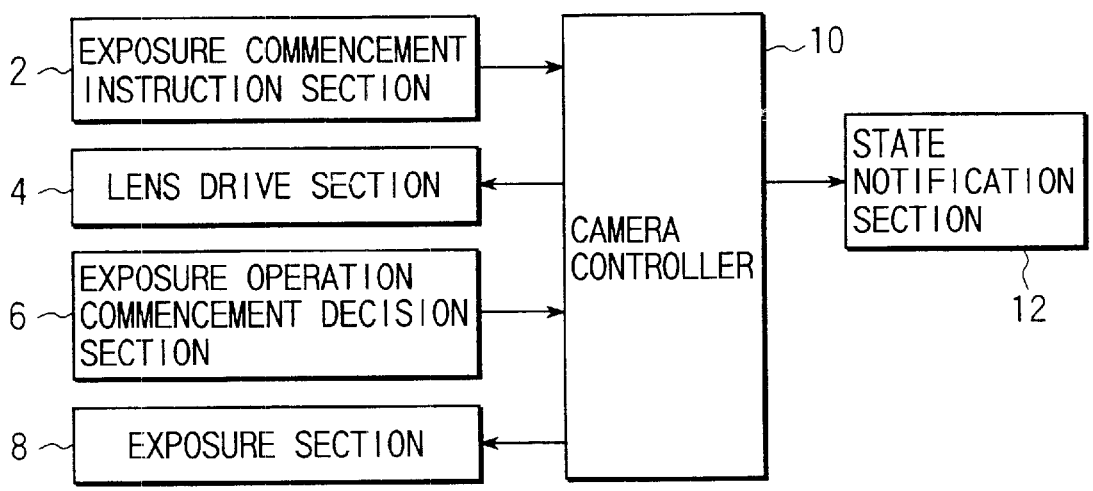
FIG. 1
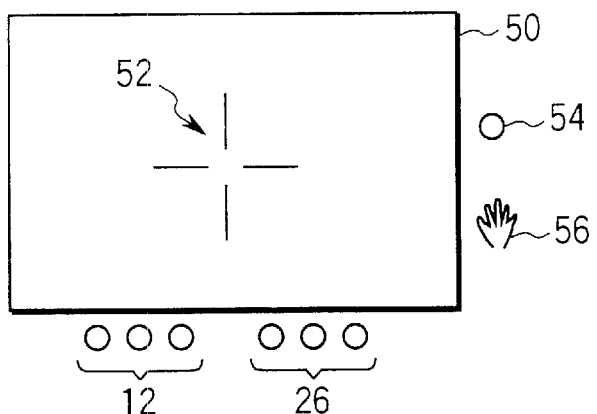
FIG. 4
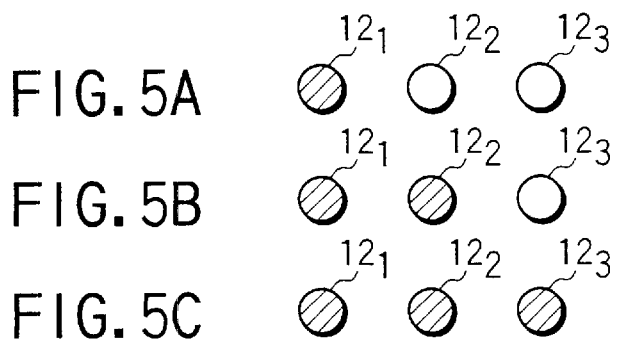
FIG. 5A
FIG. 5B
FIG. 5C

| NO. | SHAKE REDUCE MODE | LD-BEFORE-2R MODE | PAT-TERN | BEFORE 2R-ON | LD (0-ABOUT 300ms) | START OF EXPOSURE (0-ABOUT 300ms) | EXPOSURE (EXPOSURE TIME) | FILM ADVANCE |
|---|---|---|---|---|---|---|---|---|
| 1 | ON | ON | 1 | ○○○ ○○○ | ●○○ ●○○ (A) | ○○○ ●○○ (B) | ●●○ ●○○ (C) | ○○○ ○○○ |
|   |   |   | 2 | 90% | 75% | 50% | 25% |   |
|   |   |   | 3 |   |   |   |   | 90% |
| 2 | OFF | ON | 1 | ○○○ ○○○ | ●○○ ●○○ (A) | ○○○ ○○○ (A) | ●●○ ●○○ (C) | ○○○ ○○○ |
|   |   |   | 2 | 90% | 75% | 75% | 25% |   |
|   |   |   | 3 |   |   |   |   | 90% |
| 3 | ON | OFF | 1 | ○○○ ○○○ | ○○○ ○○○ | ○○○ ●○○ (B) | ●●○ ●○○ (C) | ○○○ ○○○ |
|   |   |   | 2 | 90% | 90% | 50% | 25% |   |
|   |   |   | 3 |   |   |   |   | 90% |
| 4 | OFF | OFF | 1 | ○○○ ○○○ | ○○○ ○○○ | ○○○ ○○○ (A) | ●●○ ●○○ (C) | ○○○ ○○○ |
|   |   |   | 2 | 90% | 90% | 90% | 25% |   |
|   |   |   | 3 |   |   |   |   | 90% |
| 5 | ON | ON | 1 | ○○○ ○○○ | ●○○ ●○○ (A) | ○○○ ●○○ (A) | ●●○ ●○○ (C) | ○○○ ○○○ |
|   |   |   | 2 | 90% | 75% | 75% | 25% |   |
|   |   |   | 3 |   |   |   |   | 90% |

FIG. 9

SHAKE REDUCTION CAMERA

CROSS-REFERENCE TO RELATED APPLICATIONS

This application i s based upon and claims the benefit of priority from the prior Japanese Patent Application No. 11-115019, filed Apr. 22, 1999, the entire contents of which are incorporated herein by reference.

BACKGROUND OF THE INVENTION

The present invention relates to a camera adapted to detect its shaking state and commence an exposure at the time when the camera shake level has reduced.

In recent years, a wide variety of cameras have been developed that are adapted to detect their shaking state and commence an exposure at the time when the camera shake level has reduced.

For example, in Jpn. Pat. KOKAI Publication No. 10-48681 is disclosed a technique to commence an exposure operation at the point of time within a given interval when both the camera shake levels in two directions perpendicular to the optical axis of the camera cross the zero level.

Also, in Jpn. Pat. KOKAI Publication No. 5-20419 is disclosed a camera with shake correction function which waits for a correction operation for camera shake due to lens driving and an exposure operation until the camera shake becomes able to be corrected for and makes a notification to that effect.

Additionally, in Jpn. Pat. KOKAI Publication No. 9-230472 is disclosed a camera which notifies the user of exposure immediately before the start of exposure.

Moreover, a camera technique is known which notifies the user of a shaking state during exposure, the notification time depending on the exposure time.

However, with the camera disclosed in Jpn. Pat. KOKAI Publication No. 10-48681, exposure is never commenced unless the shake level becomes zero. Therefore, the user cannot know that the reason why exposure is not commenced is a camera failure or shake control.

With the camera disclosed in Jpn. Pat. KOKAI Publication No. 5-204019, the user cannot know that the reason why an exposure operation is not performed is lens driving or a great camera shake. This will cause the user to feel long to exposure and feel uneasiness.

With the camera disclosed in Jpn. Pat. KOKAI Publication No. 9-230472, the user is notified of exposure immediately before the commencement of exposure. However, the user cannot do anything even if he or she is notified immediately before commencement of exposure.

With the camera adapted to notify the user of its exposure state, when the time taken by lens driving is long or the shake reduction function of commencing exposure when the shake level is reduced is used, the notification (exposure) may not be performed for a long time even if the shutter release has been clicked. The user may mistake this for a camera failure.

BRIEF SUMMARY OF THE INVENTION

It is therefore an object of the present invention to provide a camera which permits each of operating states of the camera in a sequence of operations from an operation of giving an instruction to commence an exposure operation to the termination of the exposure operation to be indicated in a stepwise manner.

According to a first aspect of the present invention, there is provided a camera comprising: exposure operation commencement instruction means for giving an instruction to commence an exposure operation; lens drive means responsive to the instruction from the exposure operation commencement instruction means for driving a focusing lens; exposure operation commencement decision means for deciding whether the exposure operation should be commenced, on the basis of the shake state which the camera body takes after the exposure operation commencement instruction means gives an instruction to commence the exposure operation; exposure means for performing the exposure operation according to the result of the decision by the exposure operation commencement decision means; camera control means for exercising overall control of the camera; and state notification means for, under the control of the camera control means, indicating operating states of at least two of the lens drive means, the exposure operation commencement decision means and the exposure means in a discernible form.

According to a second aspect of the present invention, there is provided a camera comprising: exposure operation commencement instruction means for giving an instruction to commence an exposure operation; lens drive means responsive to the instruction from the exposure operation commencement instruction means for driving a focusing lens; exposure operation commencement decision means for deciding whether the exposure operation should be commenced, on the basis of the shake state which the camera body takes after the exposure operation commencement instruction means gives an instruction to commence the exposure operation; exposure means for performing the exposure operation according to the result of the decision by the exposure operation commencement decision means; camera control means for exercising overall control of the camera; and state notification means for, under the control of the camera control means, indicating operating states of the lens drive means, the exposure operation commencement decision means and the exposure means in a discernible form.

According to a third aspect of the present invention, there is provided a camera comprising: exposure operation commencement instruction means for giving an instruction to commence an exposure operation; lens drive means responsive to the instruction from the exposure operation commencement instruction means for driving a focusing lens; exposure operation commencement decision means for deciding whether the exposure operation should be commenced, on the basis of the shake state which the camera body takes after the exposure operation commencement instruction means gives an instruction to commence the exposure operation; exposure means for performing the exposure operation according to the result of the decision by the exposure operation commencement decision means; camera control means for exercising overall control of the camera; and state notification means for, under the control of the camera control means, indicating that the exposure operation commencement decision means is in operation in a discernible form.

According to a fourth aspect of the present invention, there is provided a camera comprising: operating state distinction means for making a distinction between at least two predetermined operating states of the camera in a sequence of operations from an operation of giving an instruction to commence an exposure operation to the termination of the exposure operation; and state notification means for performing stepwise indication of the two predetermined operating states.

According to a fifth aspect of the present invention, there is provided a camera comprising: lens drive device for driving a focusing lens; exposure device for performing an exposure operation; exposure operation commencement decision means for deciding the timing of commencing the exposure operation after the focusing lens has been driven by the lens drive device; and state notification means for indicating operating states of the lens drive device and the exposure device in a discernible form during the operation of the exposure operation commencement decision means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a basic block diagram of a camera according to an embodiment of the present invention;

FIG. 4 shows a display layout of the viewfinder of the camera;

FIGS. 5A, 5B and 5C show an example of state indication by three LEDs forming the state notification section;

FIG. 9 shows a correspondence relationship among the shake reduce mode, the LD mode before the second release is rendered ON, and the state notification.

DETAILED DESCRIPTION OF THE INVENTION

Figure 2:
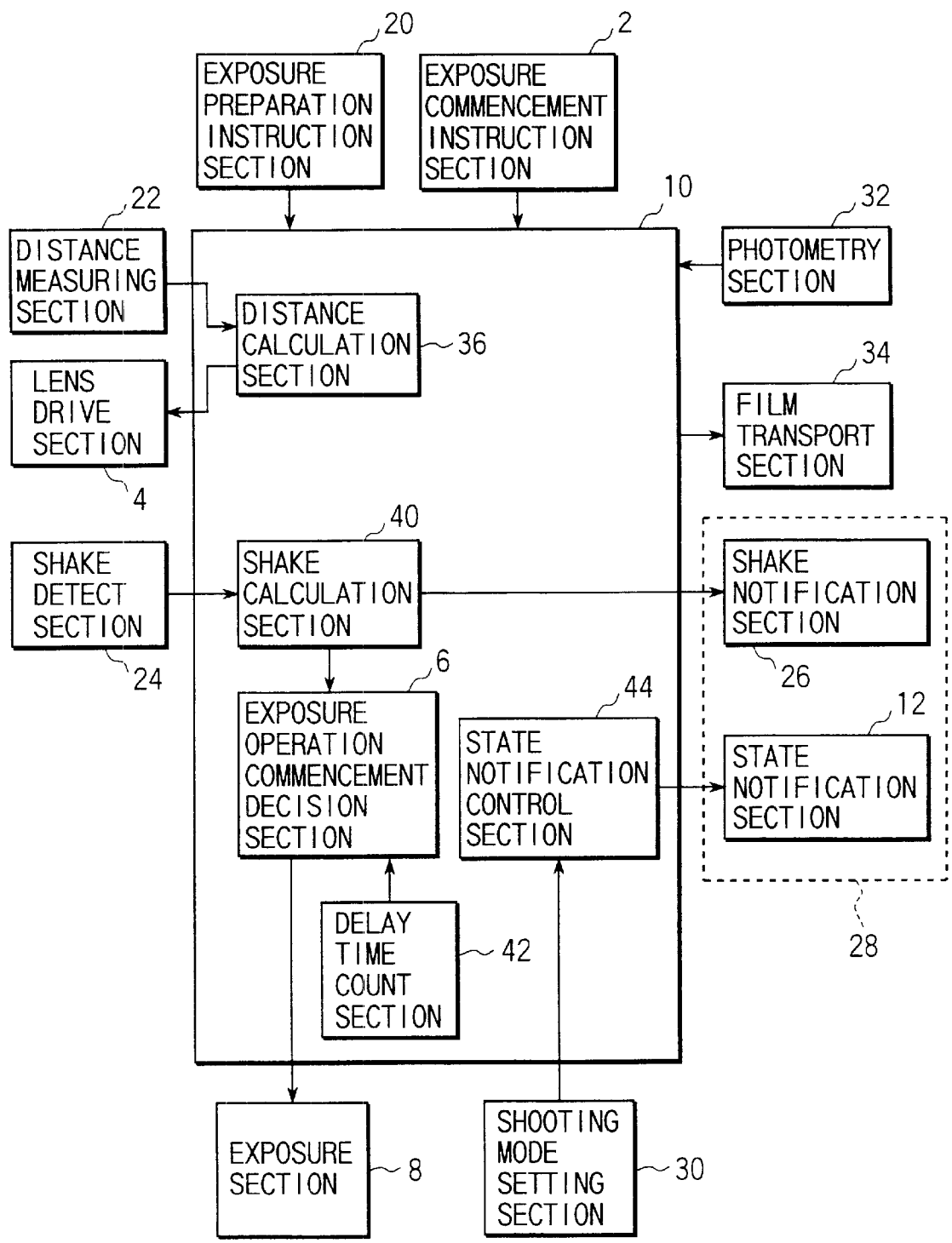
FIG. 2 is a more detailed block diagram of the camera.

FIG. 1 is a basic block diagram of a camera according to an embodiment of the present invention.

This camera is constructed, as shown in FIG. 1, from an exposure commencement instruction section 2 as exposure operation commencement instruction means, a lens drive section 4 as lens drive means, an exposure operation commencement decision section 6 as exposure operation commencement decision means, an exposure section 8 as exposure means, a camera controller as camera control means, and a state notification section 12 as state notification means.

The exposure commencement instruction section 2 (i.e., shooting operation commencement instruction section) is designed to instruct the start of a sequence of photographing that is performed by the lens drive section 4 and the exposure section 8. The section 2 corresponds to a second release switch. The lens drive section 4 is adapted to drive a focusing lens as instructed by the exposure commencement instruction section 2 and is constructed from a motor, gears and so on.

The exposure operation commencement decision section 6 is adapted to make a decision as to whether or not an exposure operation is to be commenced on the basis of a shaking state of the camera after the exposure commencement instruction has been given by the exposure commencement instruction section 2 and implemented by an algorithm executed by a CPU. The exposure section 8 is adapted to perform an exposure operation according to the result of the decision by the exposure operation commencement decision section 6 and corresponds to a shutter.

The camera controller 10 is adapted to control the overall operation of the camera and corresponds to a CPU. The state notification section 12 is adapted to notify the user of the operating states of each of the lens drive section 4, the exposure operation commencement decision section 6 and the exposure section 8. The state notification section is formed of visual display means, such as LEDs or an LCD, or sound producing means, which allow stepwise state notification.

In such an arrangement, when instructed to commence exposure by the exposure commencement instruction section 2, the camera controller 10 activates the lens drive section 4, so that the focusing lens not shown is moved. The state at this point is indicated to the camera user through the state notification section 12.

At the termination of the lens driving by the lens driving section 4, the exposure operation commencement decision section 6 makes a decision as to whether to commence an exposure operation on the basis of a camera shake state after the instruction to commence exposure has been given by the exposure commencement instruction section 2. While the decision is being made, the state notification section 12 makes notification to the effect that the operation is in the step of exposure operation commencement.

If the decision by the exposure operation commencement decision section 6 is that the camera shake level is small enough to allow the exposure operation, then the exposure section 8 performs the exposure operation. At this point, the state notification section 12 makes notification to the effect that exposure is being made.

FIG. 2 is a more detailed block diagram of the camera embodying the present invention.

In FIG. 2, to the camera controller 10 are connected the exposure commencement decision section 2, the lens drive section 4, the exposure section 8, an exposure preparation instruction section 20 corresponding to a first release switch, a distance measuring section 22, a camera shake detect section 24 consisting of shake sensors, such as angular velocity sensors, gyros, or the like, a viewfinder section 28 having the state notification section 12 and a shake notification section 26, a shooting mode setting section 30, a photometry section 32 having an AE (automatic exposure) sensor, and a film transport section 34.

In order to detect shakes in the vertical and horizontal directions of film frame, the shake detect section 24 is normally equipped with two shake sensors.

The camera controller 10 has the exposure operation commencement decision section 6, a distance calculation section 36, a shake calculation section 40, a delay time count section 42, and a state notification control section 44.

The shake calculation section 40 performs a shake detecting process through filtering for removing noise of unwanted frequencies other than shakes. In order to allow the shake notification section 26 to indicate the current image shaking state, an amount of image shake is calculated in the shake calculation section 40 taking into account shake information, focal distance information, and exposure time information. The results of the detecting process prior to the image shake calculation are sent to the exposure operation commencement decision section 6.

Upon receipt of an exposure instruction input from the exposure commencement instruction section 2, the exposure operation commencement decision section 6 makes a decision about when to allow the exposure section 8 to commence exposure on the basis of the result of shake detection by the shake detect section 24. The delay time count section 42 is connected with the exposure operation commencement decision section 6.

If the camera shake level does not become lowered, an exposure operation will not be commenced for a long time. In such a case, the user may mistake it for a camera failure. Even if the camera shake is not reduced a low level, if a given period of time has elapsed, it is desirable to commence an exposure operation. For this reason, a delay time is preset and counted by the delay time count section 42. When the delay time is reached, the exposure operation commencement decision section 6 is signaled to allow the exposure section to make exposure regardless of camera shake.

In the shake notification section 26 within the viewfinder section 28, the current shake level is indicated on the basis of detected shake information.

The shooting mode setting section 30 sets various modes, such as a shake compensation mode in which exposure is commenced at a time when the camera shake level is low, a mode in which the lens is driven before the second release (2R) switch is turned on (hereinafter referred to as LD-before-2R mode), and so on. In response to a mode setting by the mode setting section 30, the state notification control section 44 allows the in-viewfinder state notification section 12 to indicate the operation mode of the camera.

Figure 3A:
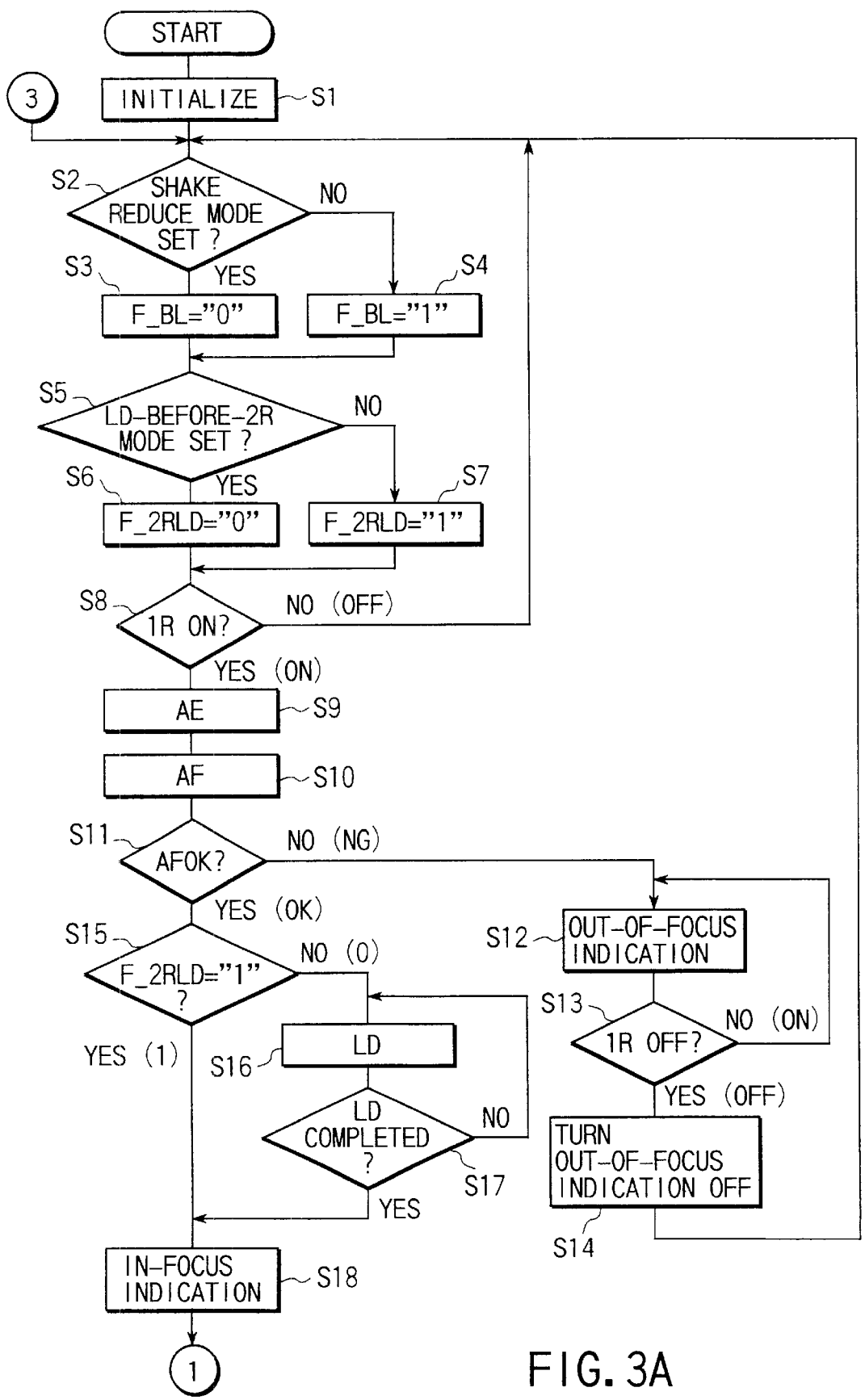
FIGS. 3A, 3B and 3C form a flowchart illustrating the operation of the camera.

Next, the operation of the camera thus arranged will be described with reference to flowcharts of FIGS. 3A, 3B and 3C.

In the first place, the camera is initialized in step S1. Then, in step S2, a decision is made as to whether or not the shake reduce mode has been set in the camera. If the shake reduce mode has been set, then the procedure goes to step S3 in which the shake reduce mode flag F_BL is set to 0; otherwise, the procedure goes from step S2 to step S4 in which the flag F_BL is set to 1.

Next, in step S5, a decision is made as to whether or not the LD-before-2R mode has been set in the camera. If the LD-before-2R mode has been set, then the procedure goes to step S6 in which the flag F_2RLD is set to 0; otherwise, the procedure goes to step S7 in which the flag F_2RLD is set to 1.

The shake reduce mode and the LD-before-2R mode are set by the shooting mode setting section 30. Each flag setting is made by the camera controller 10.

Next, in step S8, a decision is made as to whether or not the first release switch has been turned on. If the first release switch has not been on, then the procedure goes step S2; otherwise, the procedure goes to step S9 in which a photometric operation is performed by the photometric section 33. Here, the exposure time is determined on the basis of the sensitivity of the film used. Next, in step S10, the subject distance is measured by the distance measuring section 22 and the amount by which the lens is to be driven is then determined by the distance calculation section 36.

Next, in step S11, a decision is made as to whether or not the subject is in focus. If the subject is not in focus, then the procedure goes to step S12 in which out-of-focus indication is given. Next, in step S13, a decision is made as to whether or not the first release (1R) switch has been turned on. If it has been turned on, then the procedure goes to step S12; otherwise, the procedure goes to step S14 to turn off the out-of-focus indication. After that, the procedure goes to step S2.

If the decision in step S11 is that the subject is in focus, then the procedure goes to step S15 to make a decision of whether the flag F_2RLD has been set to 1. If the flag F_2RLD has not been set to 1, that is, if the LD-before-2R mode has not been set, then the procedure goes to step S18.

If, in step S15, the flag F_2RLD is 0, the LD-before-2R mode has been set and hence the procedure goes to step S16 in which the focusing lens is driven by the lens drive section 4. A decision is then made in step S17 as to whether the lens driving has been completed. Steps S16 and S17 are repeated until the lens driving has been completed. If the lens driving has been completed, then the procedure goes to step S18.

In step S18, in-focus indication is given. Next, a decision is made in step S19 as to whether the flag F BL has been set to 0, i.e., whether the shake reduce mode has been set. If the flag F_BL is 1, i.e., if the camera is not in the shake reduce mode, then the procedure goes to step S23.

If, in step S19, the camera is in the shake reduce mode, then the procedure goes to step S20 in which a camera shake is detected. This is performed by sampling an output signal of the shake detect section 24 with an A/D converter not shown in the camera controller 10.

In step S21, filtering is performed to remove unwanted frequency components other than shake-related frequencies. Next, in step S22, shake notification is made by the shake notification section 26. This notification is indication of that the amount of shake is being calculated on the basis of shake information, focal length and exposure information, and the results of the calculations.

Next, in step S23, a decision is made as to whether the second release switch has been turned on. If the second release switch is off, then the procedure goes to step S24 in which a decision is again made as to whether the first release switch is off. If the first release switch is on, then the procedure goes to step S19.

If, on the other hand, the first release switch is off, then the procedure goes to step S25 to turn the in-focus indication off. A decision is them made in step S26 as to whether the shake reduce mode flag F_BL has been set to 0. If the flag F_BL is 0, i.e., if the shake reduce mode has been set, the shake notification is made off in step S27 and the shake detection is rendered off in step S28. Subsequent to step S28 or if the decision in step S26 is that the shake reduce mode has not been set, then the procedure goes to step S2.

If the decision in step S23 is that the second release switch has been turn on, then the procedure goes to step S29 to turn off the in-focus indication. A decision is them made in step S30 as to whether the shake reduce mode flag F_BL has been set to 0. If the flag F_BL is 0, i.e., if the shake reduce mode has been set, the shake notification is made off in step S31 and the shake detection is rendered off in step S32. Each indication is rendered off in response to the second release switch being turned on. However, the shake detection is rendered off temporarily for the next lens driving.

Subsequent to step S32 or if the decision in step S30 is that the shake reduce mode has not been set, then the procedure goes to step S33 to make a decision of whether the flag F_2RLD has been set to 1. If the flag F_2RLD has been set to 1, that is, if the LD-before-2R mode has been set, then the procedure goes to step S34; otherwise, the procedure goes to step S37.

In step S34, state notification is made by the state notification section 12.

Here, the state notification will be described.

FIG. 4 shows a display layout of the viewfinder section 28.

The viewfinder section is provided with a picture frame 50 having a measurement area 52 formed at the center. On the right-hand side of the picture frame 50 are provided a mark 54 that makes notification to the effect that focusing operation is being performed and a mark 56 that indicates the shake reduce mode. The state notification section 12 and the shake notification section 18 are provided below the picture frame 50, each section being composed of a plurality of LEDs (three in the drawing).

The state notification section 12 indicates one of three states as shown in FIGS. 5A to 5C, depending on the state of the camera. In FIGS. 5A to 5C and FIGS. 6A to 6C and 7A to 7C to be described below, the shaded LEDs indicate that they are lit up, and unshaded LEDs indicate otherwise.

In FIG. 5A, only the LED $12_1$ is lit up, indicating the state A in which the focusing lens is being driven. In FIG. 5B, the LEDs $12_1$ and $12_2$ are lit up, indicating the state B in which a decision is being made as to whether to commence exposure. In FIG. 5C, all the LEDs $12_1$, $12_2$ and $12_3$ are lit up, indicating the state C in which exposure is being made.

Thus, the user can easily confirm the operating state of the camera by changing the lighting conditions of the LEDs $12_1$, $12_2$ and $12_3$.

The state notification may be made not only by varying the number of LEDS that are lit up as shown in FIGS. 5A to 5C but by any other scheme provided that it allows the user to distinguish among the operating states.

Figure 6A:
FIGS. 6A, 6B and 6C show another example of state indication by three LEDs forming the state notification section.
Figure 6B:
Figure 6C:
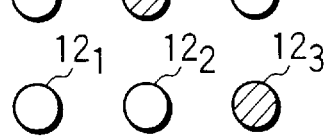

For example, as shown in FIGS. 6A to 6C, each of the three LEDs may be lit up separately to correspond with a different one of the operating states A, B and C. This allows the user to know which of the operating states the camera is placed in.

Although the LEDS $12_1$, $12_2$ and $12_3$ used in FIGS. 5A to 5C and FIGS. 6A to 6C may be of the same color, they may each be of a separate color, which allows the user to confirm the operating states more clearly.

Figure 7A:
FIGS. 7A, 7B and 7C show an example of shake indication by three LEDs forming the shake notification section.
Figure 7B:
Figure 7C:
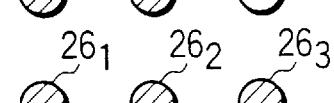

FIGS. 7A to 7C show a display example based on three LEDs that constitute the shake notification section 26. In this case, three shake levels are displayed.

The state in which only the LED $26_1$ is lit up as shown in FIG. 7A represents that the camera shake level is low. The state in which the LEDs $26_1$ and $26_2$ are lit up as shown in FIG. 7B represents that the shake level is medium. The state in which all the LEDs $26_1$ to $26_3$ are lit up as shown in FIG. 7C represents that the shake level is high.

Like the state notification section 12, the shake notification section 26 may also be modified in the way to light up the LEDs.

Figure 3B:
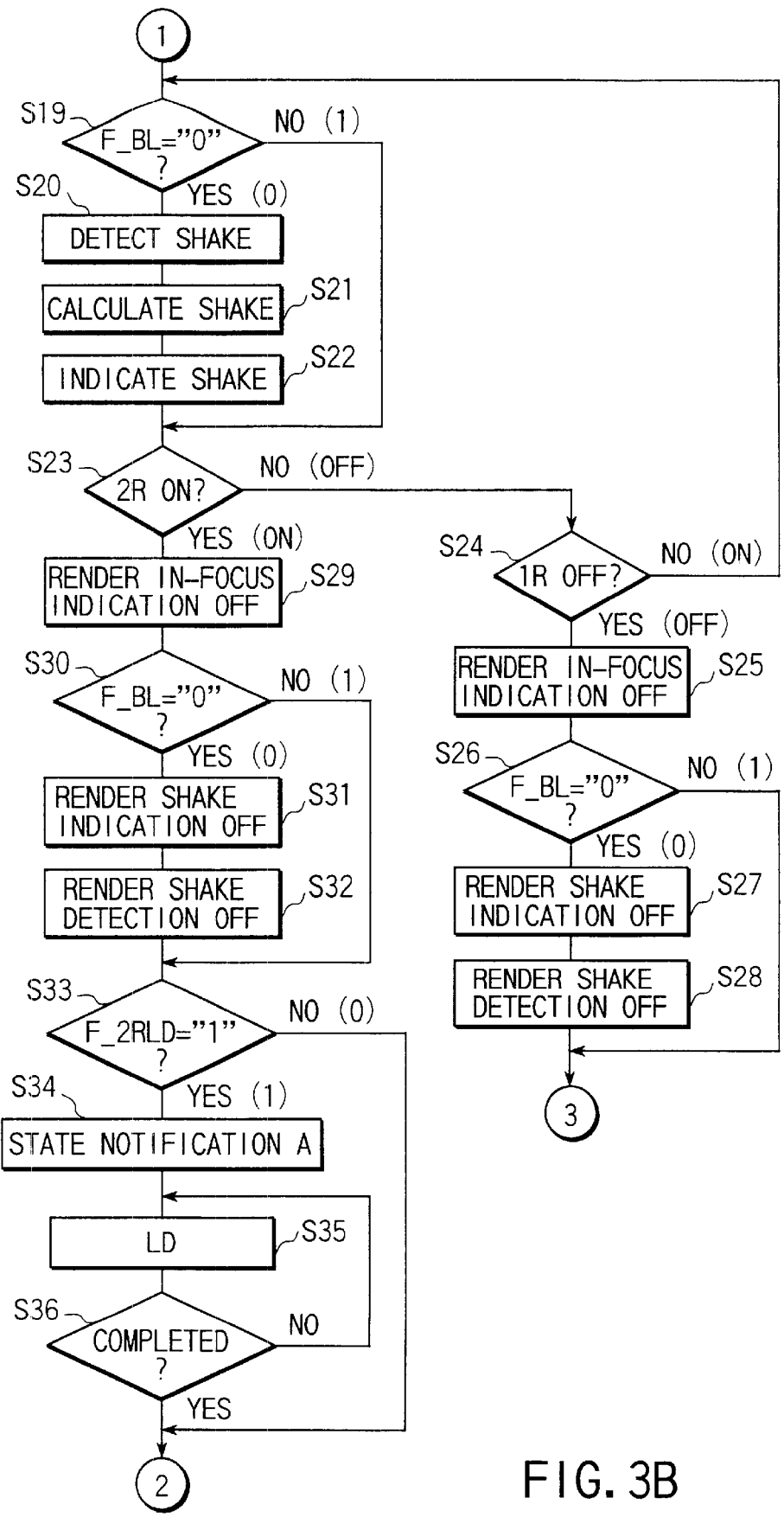
Figure 3C:
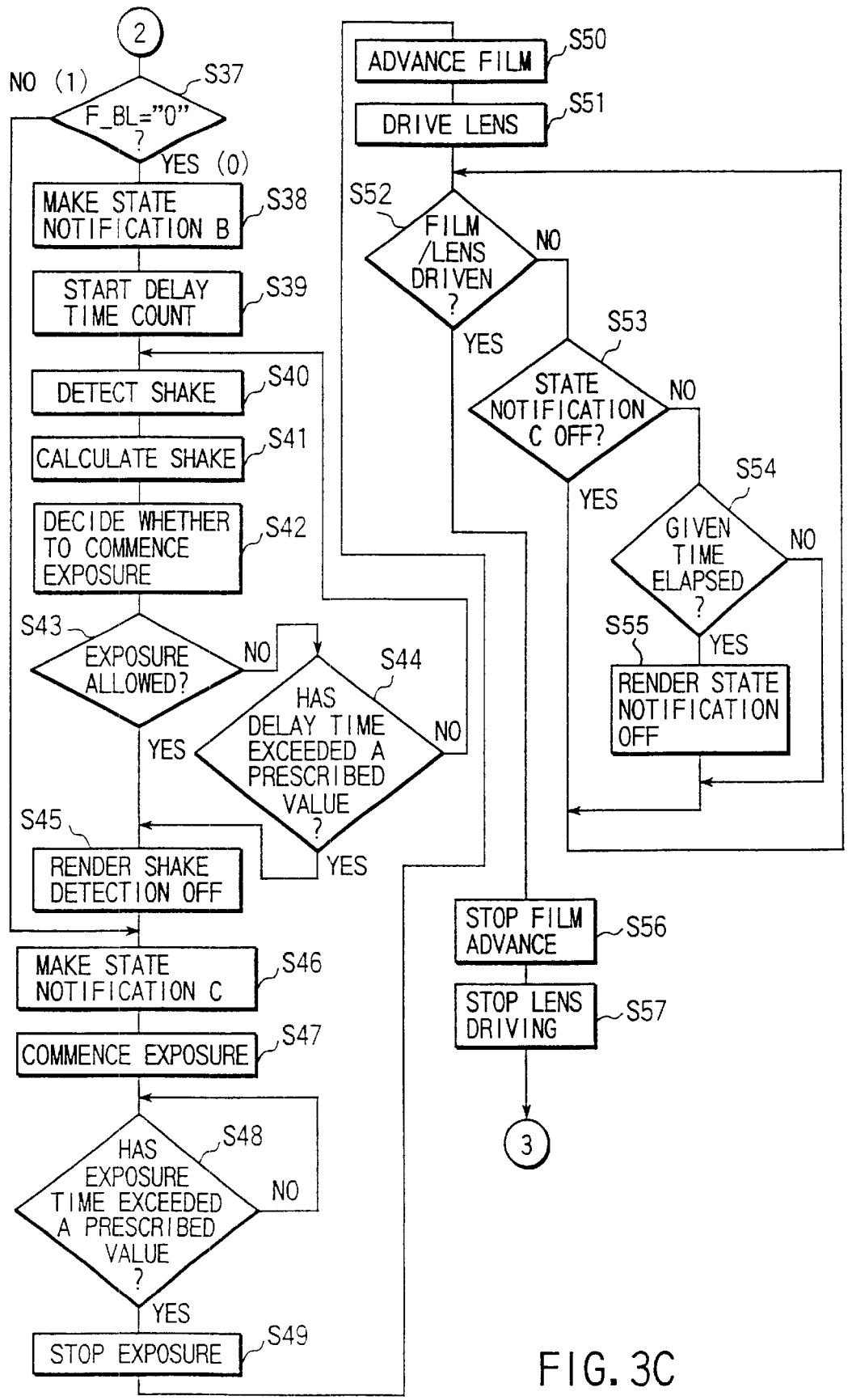

Returning to the flowchart of FIG. 3B, in step S34, the state notification section 12 makes notification of the operating state A, i.e., that the lens is being driven. In subsequent step S35, the focusing lens is driven by the lens drive section 4. Steps S35 and S36 are repeated until the lens driving has been completed.

After the lens has been driven, the process goes to step S37 to make a decision as to whether or not the shake reduce mode has been set. If the shake reduce mode has not been set, then the procedure goes to step S46. If, on the other hand, the shake reduce mode has been set, then the procedure goes to step S38 to make state notification B to the effect that a decision is being made as to whether to commence exposure.

In subsequent step S39, the delay time count section 42 begins counting a delay time. After that, camera shake is detected in step S40 by the shake detect section 24 and the amount of shake is calculated in step S41 by the shake amount calculation section 40. Next, in step S42, a decision is made as to whether to commence an exposure operation. This decision procedure is described in detail in Jpn. Pat. KOKAI Publications Nos. 3-92830 and 10-48681 by way of example.

In subsequent step S43, a decision is made as to whether or not it is permitted to commence exposure. If not permitted, the procedure goes to step S44 in which a decision is made as to whether or not the delay time counted by the delay time count section 42 has reached a given length of time. As described previously, an exposure operation is not permitted unless the camera shake is reduced to a low level. If, therefore, the camera shake is not lowered, an exposure operation will not be commenced even after a long wait. In such a case, the user may mistake it for a camera failure. For this reason, the camera is set to commence an exposure operation when a given period of time, for example, 300 msec, has elapsed. This technique is described in Jpn. Pat. KOKAI Publication No. 9-138433 by way of example.

Therefore, if the given period of time has not yet been reached in step S44, then the procedure returns to step S40; otherwise, the procedure goes to step S45.

If, in step S43, exposure commencement has been allowed or if, in step S44, the given period of time has elapsed, then the shake detection is rendered off in step S45. At this point, the time counting by the delay time count section 42 is stopped.

Next, in step S46, the state notification C is made to the effect that exposure is being made. After that, exposure is commenced by the exposure section 8 in step S47 and a decision is then made in step S48 as to whether or not a given exposure time has elapsed. If the exposure time has elapsed, then the procedure goes to step S49 to stop the exposure.

In subsequent step S50, the film is advanced by one frame by the film transport section 34. After that, in step S51, lens driving is started to return the focusing lens to its original position.

In step S52, a decision is made as to whether or not the film and lens have been driven. If not, the procedure goes to step S53 to make a decision of whether or not the state notification C by the state notification section 12 has been rendered off. If so, the procedure returns to step S52; otherwise, the procedure goes to step S54 to make a decision of whether or not a given time has elapsed since the state notification C was made.

The state notification C depends basically on exposure time. When the exposure time is too short, the user cannot recognize the state notification. Therefore, when the exposure time is not less than a given time of, say, 150 msec, the state notification C is made regardless of exposure time.

If, in step S54, the given time has elapsed, the procedure returns to step S52 after the state notification C has been rendered off in step S55; otherwise, the procedure directly returns to step S52.

If YES in step S52, driving of the film and lens is stopped in subsequent steps S56 and S57. The procedure then returns to step S2.

Figure 8:
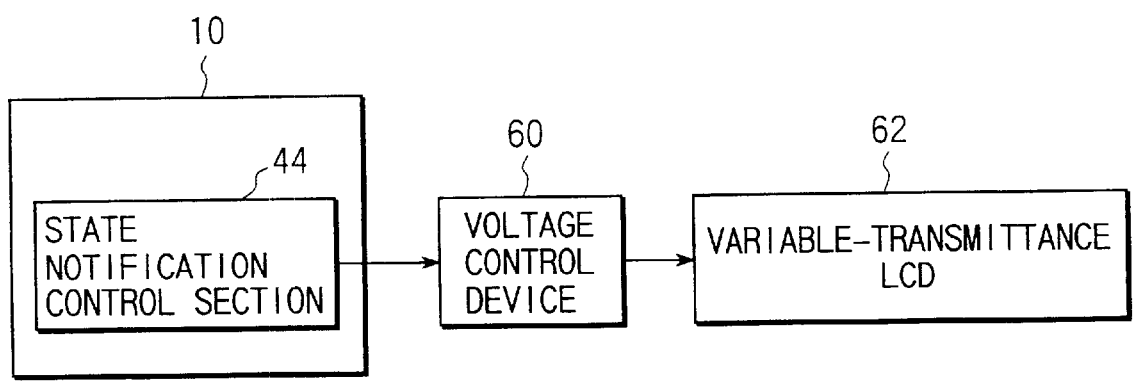
FIG. 8 is a block diagram illustrating another arrangement for state notification using liquid crystal display within the viewfinder.

FIG. 8 shows another arrangement for state notification, which utilizes liquid crystal display within the viewfinder section 28.

In FIG. 8, a variable-transmittance liquid crystal display device 62 is connected through a voltage control device 60 to the state notification section 44 in the camera controller 10. This variable-transmittance liquid crystal display device 62 is a liquid crystal display device in which the transmittance varies with the applied voltage and formed of, say, a polymer net liquid crystal material. The voltage control device 60 varies the magnitude of applied voltage to the liquid crystal display device 62 so as to vary its transmittance.

Thus, the transmittance of the liquid crystal display provided in the viewfinder section 28 of the camera can be varied.

FIG. 9 is a table showing the relation between the shake reduce mode and the LD-before-2R mode, both indicated by the state notification section.

In this table, white circles each represent that the corresponding LED is switched off, whereas black circles each represent that the corresponding LED is lit up. And (A), (B) and (C) correspond to the state notifications A, B and C, respectively.

In FIG. 9, pattern 1 corresponds to the state where the LEDs $12_1$ to $12_3$ are lit up according to the manner shown in FIGS. 5A to 5C. Pattern 2 corresponds to the state where the LEDs $12_1$ to $12_3$ are lit up according to the manner shown in FIGS. 6A to 6C. Further, pattern 3 indicates the transmission factor when the variable-transmission-factor liquid crystal display device 62 shown in FIG. 8 is used.

In the case of the pattern 3 described above, for example, both the shake reduce mode and the LD-before-2R mode are on in the cases Nos. 1 and 5. In the case No. 5, the lens driving operation and the exposure commencement decision operation are indicated by the same state notification.

Taking No. 1 by way of example, the transmission factor of liquid crystal is set to 90% before 2R ON, 75% at the time of exposure commencement decision, 25% at the time of exposure, and 90% at the time of film transportation.

Thus, if any pattern is used, stepwise indication can be given according to the state notification.

Although the present invention has been described in terms of the embodiment in which the state notifications are made through the use of LEDs or LCD, this is not restrictive. Audible display means could be used for state notification. That is, any display means can be used provided that they allow stepwise state notification.

As described above, according to the present invention, a sequence of operations of a camera from exposure commencement instruction (2R ON) to the termination of exposure, specifically, a lens drive operation, an exposure commencement timing control operation, and an exposure operation, are indicated to the user in a stepwise manner. Thus, the user can know which of the operating states the camera is now placed in.

In particular, even if exposure is delayed due to the driving of focusing lens and/or a decision of whether to commence exposure based on camera shake, the shooter can know that the camera is working properly and can devote himself or herself to shooting. In addition, since lighting means or variable-transmittance liquid crystal display device placed within the viewfinder is used as state notification means, the shooter can know visually that exposure is approaching while viewing through the viewfinder.

According to the present invention, as described above, a camera can be provided which permits each of its operating states to be indicated to shooters in a stepwise manner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera which detects a shake state and commences exposure at a timing at which a shake amount of the shake state is reduced, said camera comprising:

a camera body;

focusing lens drive means for driving a focusing lens, based on a drive amount determined in accordance with a distance measuring result;

exposure means for executing an exposure operation, based on an exposure time determined in accordance with an output of a photometry section;

exposure operation commencement instruction means for outputting an exposure operation commencement instruction signal to give an instruction to commence the exposure operation;

exposure operation commencement decision means for determining and controlling the timing at which the exposure means commences the exposure operation such that the shake amount is reduced to a predetermined level or less, based on the shake state of the camera body detected after the exposure operation commencement instruction means has given the instruction to commence the exposure operation; and state notification means for indicating to a user, in a discernible form, which one of the focusing lens drive means, the exposure operation commencement decision means and the exposure means is in operation;

wherein operations of the focusing lens drive means, the exposure operation commencement decision means and the exposure means are automatically commenced successively in order in response to the exposure operation commencement instruction signal output by the exposure operation commencement instruction means.

2. The camera according to claim 1, wherein the state notification means comprises a plurality of lighting members that are provided within or in a vicinity of a viewfinder of the camera body, said plurality of lighting members being adapted to indicate the operating state of each of the focusing lens drive means, the exposure operation commencement decision means and the exposure means.

3. The camera according to claim 1, further comprising:

shooting mode setting means for setting/changing camera shooting modes to a selected one of a shake reduction mode in which the shake amount is reduced and a shake non-reduction mode in which the shake amount is not reduced; and state notification control means for changing how the state notification means indicates the operating state of each of the focusing lens drive means, the exposure operation commencement decision means and the exposure means according to the shooting mode set by the shooting mode setting means.

4. A camera which detects a shake state and commences exposure at a timing at which a shake amount of the shake state is reduced, said camera comprising:

a camera body;

focusing lens drive means for driving a focusing lens, based on a drive amount determined in accordance with a distance measuring result;

exposure means for executing an exposure operation, based on an exposure time determined in accordance with an output of a photometry section;

exposure operation commencement instruction means for outputting an exposure operation commencement instruction signal to give an instruction to commence the exposure operation;

exposure operation commencement decision means for determining and controlling the timing at which the exposure means commences the exposure operation such that the shake amount is reduced to a predetermined level or less, based on the shake state of the camera body detected after the exposure operation commencement instruction means has given the instruction to commence the exposure operation; and state notification means for indicating to a user that the exposure operation commencement decision means is in operation, in a discernible form with respect to the focusing lens drive and the exposure means, at least when the exposure operation commencement decision means is being operated;

wherein operations of the focusing lens drive means, the exposure operation commencement decision means and the exposure means are automatically commenced successively in order in response to the exposure operation commencement instruction signal output by the exposure operation commencement instruction means.

5. The camera according to claim 4, wherein the state notification means makes a first display when the focusing lens drive means is in operation, a second display when the exposure operation commencement decision means is in operation, and a third display when the exposure means is in operation.

6. The camera according to claim 5, wherein the state notification means comprises lighting devices that are placed within or in a vicinity of a viewfinder of the camera body.

7. The camera according to claim 5, wherein the state notification means comprises lighting devices that are placed within or in a vicinity of a viewfinder of the camera body, said lighting devices being adapted to make the first, second and third displays.

8. The camera according to claim 5, wherein the state notification means comprises a variable-transmittance liquid crystal device that is placed within a viewfinder optical system of the camera body.

9. The camera according to claim 4, wherein the state notification means comprises a variable-transmittance liquid crystal device that is placed within a viewfinder optical system of the camera body.

10. A camera which detects a shake state and commences exposure at a timing at which a shake amount of the shake state is reduced, said camera comprising:

a camera body;

a focusing lens drive device for driving a focusing lens, based on a drive amount determined in accordance with a distance measuring result;

an exposure device for executing an exposure operation, based on an exposure time determined in accordance with an output of a photometry section;

an exposure operation commencement decision device for determining and controlling the timing at which the exposure means commences the exposure operation such that the shake amount is reduced to a predetermined level or less, based on the shake state of the camera body detected after an operation of the focus lens drive device is terminated; and a state notification device for indicating to a user that the exposure operation commencement decision device is in operation, in a discernible form with respect to the focusing lens drive device and the exposure device, when the exposure operation commencement decision device is being operated;

wherein the focusing lens drive device, the exposure operation commencement decision device and the exposure device are automatically operated successively in order in response to the exposure operation commencement instruction signal output by the exposure operation commencement instruction device.

11. The camera according to claim 10, wherein the state notification device makes a first display when the focusing lens drive device is in operation, a second display when the exposure operation commencement decision device is in operation, and a third display when the exposure device is in operation.

12. The camera according to claim 11, wherein the state notification device comprises lighting devices that are placed within or in a vicinity of a viewfinder of the camera body.

13. The camera according to claim 11, wherein the state notification device comprises a variable-transmittance liquid crystal device that is placed within a viewfinder optical system of the camera body.

14. The camera according to claim 10, further comprising:

a shooting operation commencement instruction device for generating an operation commencement signal for commencing a sequence of operations of the focusing lens drive device, the exposure operation commencement decision device and the exposure device to be conducted automatically in order; and a control device for terminating the operation of the exposure operation commencement decision device and initiating the operation of the exposure device, upon lapse of a predetermined time after the shooting operation commencement instruction device generates the operation commencement signal, regardless of the shake state of the camera body.

15. The camera according to claim 10, further comprising:

a shooting operation commencement instruction device for generating an operation commencement signal for commencing a sequence of operations of the focusing lens drive device, the exposure operation commencement decision device and the exposure device; and a shake detection device for detecting a shake state of the camera body;

wherein the exposure operation commencement decision device determines the timing of commencing the exposure operation based on the shake state of the camera body detected after the shooting operation commencement instruction device has generated the operation commencement signal.

* * * * *